(12) United States Patent
Tajiri

(10) Patent No.: US 7,470,178 B2
(45) Date of Patent: Dec. 30, 2008

(54) AIR-CONDITIONER FOR VEHICLE

(75) Inventor: Akihiro Tajiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 11/220,071

(22) Filed: Sep. 6, 2005

(65) Prior Publication Data

US 2006/0068694 A1 Mar. 30, 2006

(30) Foreign Application Priority Data

Sep. 7, 2004 (JP) ............................. 2004-260126

(51) Int. Cl.
*B60H 1/34* (2006.01)
(52) U.S. Cl. ..................................... 454/155
(58) Field of Classification Search .................. 454/76, 454/155, 154, 310

See application file for complete search history.

(56) References Cited

U.S. PATENT DOCUMENTS

| 117,853 | A | * | 8/1871 | Allen | 251/352 |
| 6,527,194 | B1 | * | 3/2003 | Burke | 236/49.3 |
| 2005/0064809 | A1 | * | 3/2005 | Thomassin et al. | 454/76 |

FOREIGN PATENT DOCUMENTS

JP 2001-191790 7/2001

\* cited by examiner

*Primary Examiner*—Steve Mcallister
*Assistant Examiner*—Helena Kosanovic
(74) *Attorney, Agent, or Firm*—Rankin, Hill & Clark LLP

(57) ABSTRACT

A vehicle air-conditioner includes an airflow regulator disposed in a duct for regulating a rate of flow of temperature-controlled air to be discharged from an air outlet of the duct. The airflow regulator is formed by a plurality of hollow frustoconical members placed one over another in a nested condition. Each of the frustoconical members is open at a small end and a large end thereof and has at least one opening formed in a sidewall thereof. The frustoconical members are rotatable relative to one another about a common central axis thereof.

10 Claims, 11 Drawing Sheets

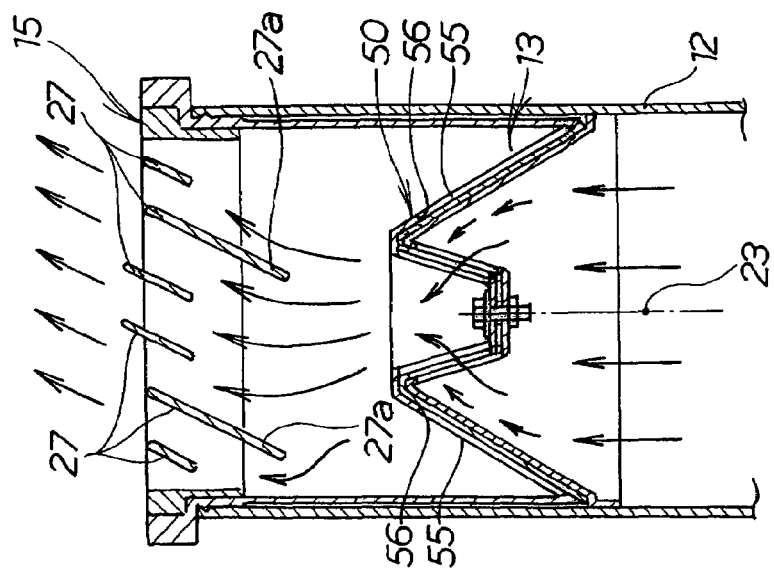
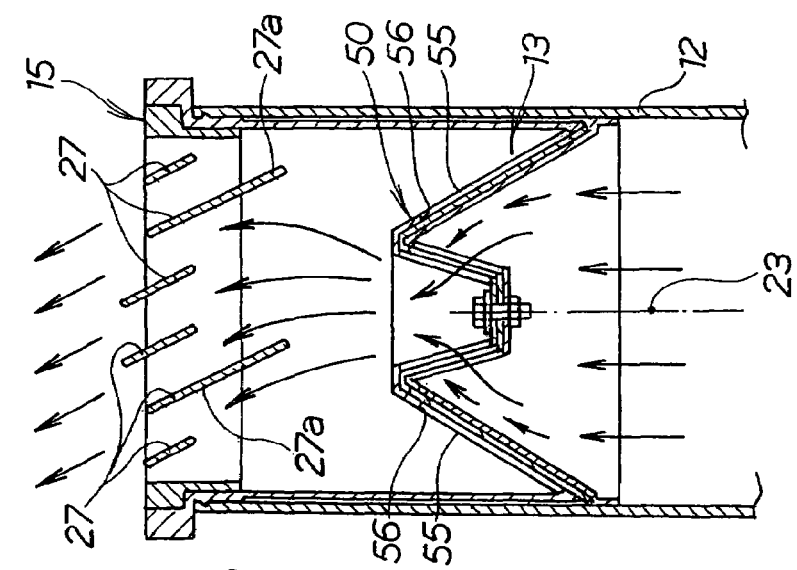
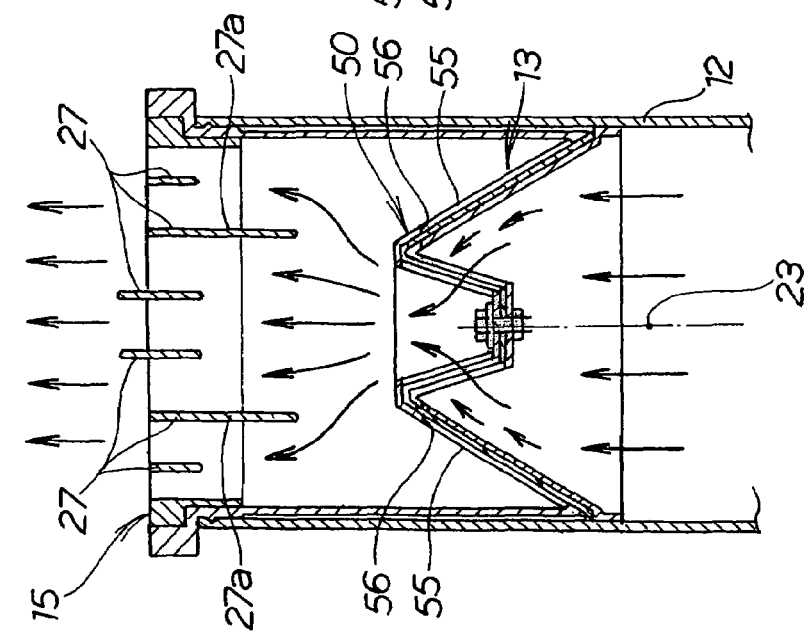

AIR-CONDITIONER FOR VEHICLE

FIELD OF THE INVENTION

The present invention relates to an air-conditioner for vehicles having an airflow regulator disposed within a duct of the air-conditioner for regulating a rate of flow of air discharged from an air outlet of the duct.

BACKGROUND OF THE INVENTION

Air-conditioners for vehicles having an airflow regulator disposed in a duct for regulating a rate of flow of air discharged from an air outlet of the duct are known as disclosed, for example, in Japanese Patent Laid-open Publication (JP-A) No. 2001-191790.

The airflow regulator of the disclosed vehicle air-conditioner, as shown here in FIG. 12, comprises an air blowout unit 100 assembled in an air outlet or vent of a duct 110. The air blowout unit 100 includes a hollow cylindrical member 101 disposed inside the air outlet, an orifice 102 connected to an end of the cylindrical member 101 facing a passenger compartment 112 of the vehicle, a nozzle member 103 disposed inside the cylindrical member 101 behind the orifice 102, and a tubular rotating member 104 loosely fitted over a part of the cylindrical member 101 from an outlet end thereof including the orifice 102. The cylindrical member 101 has two axially spaced rows of openings 105 formed in a peripheral wall thereof at regular intervals in a circumferential direction of the cylindrical member 101. The tubular rotating member 104 has a pair of openings 105 formed in a peripheral wall thereof in diametrically opposite relation. The nozzle member 103 has a pair of slide pins 107 projecting from an outer cylindrical surface in opposite directions. The slide pins 107 each extend through a guide groove 109 formed diagonally in the peripheral wall of the cylindrical member 101 and is received in an axial guide groove 108 formed in the tubular rotating member 104.

With this arrangement, by turning the tubular rotating member 104 about its own axis, the nozzle member 103 moves in an axial direction relative to the cylindrical member 101 between a first position shown in a left half of FIG. 12 where the nozzle member 103 is located close to the orifice 102, and a second position shown in a right half of FIG. 12 where the nozzle member 103 is located remotely from the orifice 102.

When the nozzle member 103 is in the first position shown in the left half of FIG. 12, the openings 106 of the rotating member 104 and those openings 105 of the cylindrical member 101 which are arranged in a row near the orifice 102 are closed by the nozzle member 103, so that conditioned air flows at a high speed from an airflow passage 111 in the nozzle member 103 into the passenger compartment 112.

Alternatively, when the nozzle member 103 is in the second position shown in the right half of FIG. 12, those openings 105 of the cylindrical member 101 which are arranged in a row remote from the orifice 102 are closed by the nozzle member 103, so that conditioned air flows in a diffusing fashion from airflow passages (extending successively through the openings 106 of the rotating member 104 and those openings 105 of the cylindrical member 101 arranged in a row near the orifice 102) into the passenger compartment 112.

Due to the airflow passages formed in a radial direction of the air blowout unit 100 across the openings 105, 106 of the tubular rotating member 104 and the cylindrical member 101 during an air diffuser mode operation, the air blowout unit (airflow regulator) 100 of the known vehicle air-conditioner requires a relatively large space for installation. In the event the duct 110 has only a limited space for installation of an airflow regulator, the known air blowout unit 100 may not be installed in an operable manner.

SUMMARY OF THE INVENTION

It is, therefore, an object of the present invention to provide a vehicle air-conditioner having an airflow regulator which is compact in size and requires a relatively small space for installation.

According to the invention, there is provided an air-conditioner for a vehicle, comprising an air-conditioning unit for controlling the temperature of air at a desired value, a duct for guiding the temperature-controlled air toward a passenger compartment of the vehicle, and an airflow regulator disposed in the duct for regulating a rate of flow of the temperature-controlled air to be supplied from the duct into a passenger compartment of the vehicle. The airflow regulator comprises a plurality of hollow frustoconical members placed one over another in a nested condition. Each of the frustoconical members is open at a small end and a large end thereof and has at least one opening formed in a sidewall thereof. The frustoconical members are rotatable relative to one another about a common central axis thereof.

With this arrangement, by angularly moving or turning the frustoconical members relative to one another about the common central axis, an opening formed jointly by the openings formed in the sidewalls of the respective frustoconical members can assume various positions including a fully closed position and a fully open position. In the fully closed position, the temperature-controlled air is supplied from an opening formed jointly by the respective open small ends of the frustoconical members. Thus, the fully closed position is suitable for achieving a spot mode operation of the airflow regulator. On the other hand, in the fully open position, the temperature-controlled air is supplied from both the opening formed jointly by the respective open small ends of the frustoconical members and the opening formed jointly by the openings in the sidewalls of the frustoconical members. The fully open position is suitable for achieving a wide mode operation of the airflow regulator. The airflow regulator formed essentially by two or more frustoconical members placed one over another in nested condition is simple in construction, requires only a small number of structural parts, and is compact in size. Furthermore, with the use of the frustoconical members, the airflow regulator does not require an airflow passage extending within the duct in a radial outward direction of the airflow regulator, which will increase the overall size of the duct.

The air-conditioner may further include an air deflector provided on an air outlet of the duct. In this instance, the airflow regulator is disposed behind the air deflector, and the air deflector has a series of deflection plates. A part of the deflection plates, which is disposed in alignment with a peripheral portion at the small end of an outermost frustoconical member of the plural frustoconical members in a direction parallel to the common central axis of the frustoconical members, is extended deeper into the duct than the remaining deflection plates to a position located near the peripheral portion at the small end of the outermost frustoconical member. By thus extending the selected part of the deflecting plates, it is possible to reliably and efficiently guide the temperature-controlled air blown out from the airflow regulator into a desired direction. This guiding function of the deflecting plates is particularly advantageous when used in combination with the fully closed position of the opening formed jointly by the side openings of the frustoconical members.

Preferably, one of the frustoconical members has an engagement portion disposed at a peripheral edge of the opening in the sidewall thereof, the engagement portion being engageable with a peripheral edge of the opening in the sidewall of an adjacent one of the frustoconical members to move the adjacent frustoconical member together with the one frustoconical member when the one frustoconical member rotates relative to the adjacent frustoconical member about the common central axis. Through an interlocking engagement between the engagement portion on one frustoconical member and the peripheral edge of the adjacent frustoconical member, it is possible to transmit a rotational motion, for example, from the one frustoconical member to the adjacent frustoconical member, thus forcing the adjacent frustoconical member to move together with the one frustoconical member. In the case where, one of two adjacent frustoconical members is fixed and not rotatable, the relative rotational motion between the two adjacent frustoconical members is limited by interlocking engagement between the engagement portion at the peripheral edge of the opening in the sidewall of one frustoconical member and the peripheral edge of the sidewall of the other frustoconical member.

The air-conditioner may further include a flow regulating ring rotatably mounted on an air outlet of the duct. In this instance, the airflow regulator is disposed behind the air outlet. The flow regulating ring is connected to one of an outermost frustoconical member and an innermost frustoconical member of the plural frustoconical members, and the other of the outermost frustoconical member and an innermost frustoconical member is secured to an inner surface of the duct. With this arrangement, by merely turning the flow regulating ring about its own axis, one of the outermost frustoconical member and the innermost frustoconical member turns together with the flow regulating ring to thereby change the area of the opening formed jointly by the openings in the sidewall of the frustoconical members.

The air-conditioner may further include a motion transfer means for transferring a rotational motion of the flow regulating ring to the one frustoconical member. In one preferred form, the motion transfer means comprises at least one connector arm disposed inside the duct and formed integrally with the flow regulating ring and the one frustoconical member. In another preferred form, the motion transfer means comprises a toothed portion formed on an outer circumferential surface of the flow regulating ring along at least part of the full circumference thereof, a first gear meshing with the toothed portion of the flow regulating ring and secured to a shaft rotatably mounted on an outer surface of the duct, a second gear secured to the shaft, and a tooth portion formed on an outer circumferential surface of the one frustoconical member along at least part of the full circumference thereof and meshing with the second gear.

Preferably, the frustoconical members each have a leg extending from an end wall at the small end toward the large end of the respective frustoconical member and having a connecting portion at a distal end thereof. The respective connecting portions of the arms are aligned with the common central axis of the frustoconical members and connected together so that the frustoconical members including the respective connecting portions are rotatable relative to one another about the common central axis of the frustoconical members. The legs of the respective frustoconical members are arranged to overlap each other when the respective openings in the sidewalls of the frustoconical members are fully closed. The legs thus arranged is particularly suitable for use with the spot mode operation because they provide a minimum resistance to a stream of air ejected from the opening formed jointly by the open small ends of the frustoconical members. When the openings in the sidewalls of the respective frustoconical members are fully open, the legs are arranged out of phase with each other about the common central axis of the frustoconical members. The thus arranged legs are particularly suitable for use with the wide mode operation of the airflow regulator because air is ejected from substantially the entire project area of a conical assembly formed by the frustoconical members.

BRIEF DESCRIPTION OF THE DRAWINGS

Certain preferred structural embodiments of the present invention will be described in detail herein below, by way of example only, with the reference to the accompanying drawings, in which:

FIGS. 9A to 9C are cross-sectional views illustrative of the operation of deflection plates of the airflow regulator;

DETAILED DESCRIPTION OF THE PREFERRED EMBODIMENTS

Figure 1:
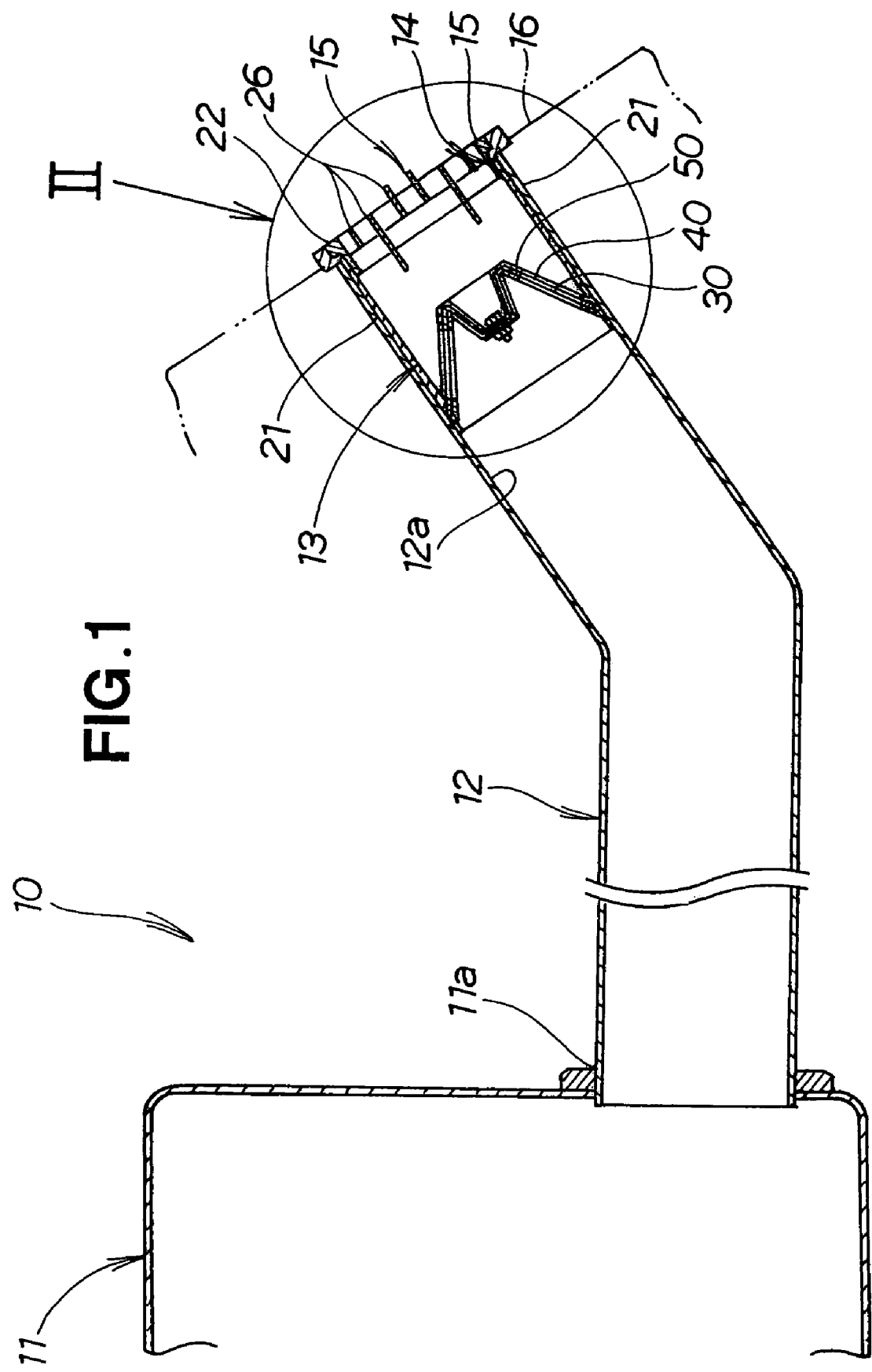
FIG. 1 is cross-sectional view diagrammatically showing the general configuration of an air-conditioner according to the present invention.

Referring now to the drawings and FIG. 1 in particular, there is shown in cross section an air-conditioner 10 for a vehicle embodying the present invention. The vehicle air-conditioner 10 generally comprises an air-conditioning unit 11 for controlling the temperature of air at a desired value, a duct 12 connected at one end to an outlet 11a of the air-conditioning unit 11 for guiding the temperature-controlled air therethrough toward a passenger compartment of the vehicle, an airflow regulator 13 disposed in the duct 12 and located in the proximity of an air outlet or vent 14 of the duct 12 for regulating a rate of flow of the temperature-controlled air to be supplied from the air outlet 14 of the duct 12 into the vehicle passenger compartment, and an air deflector 15 provided on the air outlet 14 of the duct 12 for deflecting or diverting the flow of the temperature-controlled air into a desired direction. The air outlet 14 is open at a dashboard 16 or a like wall member of the vehicle.

Figure 2:
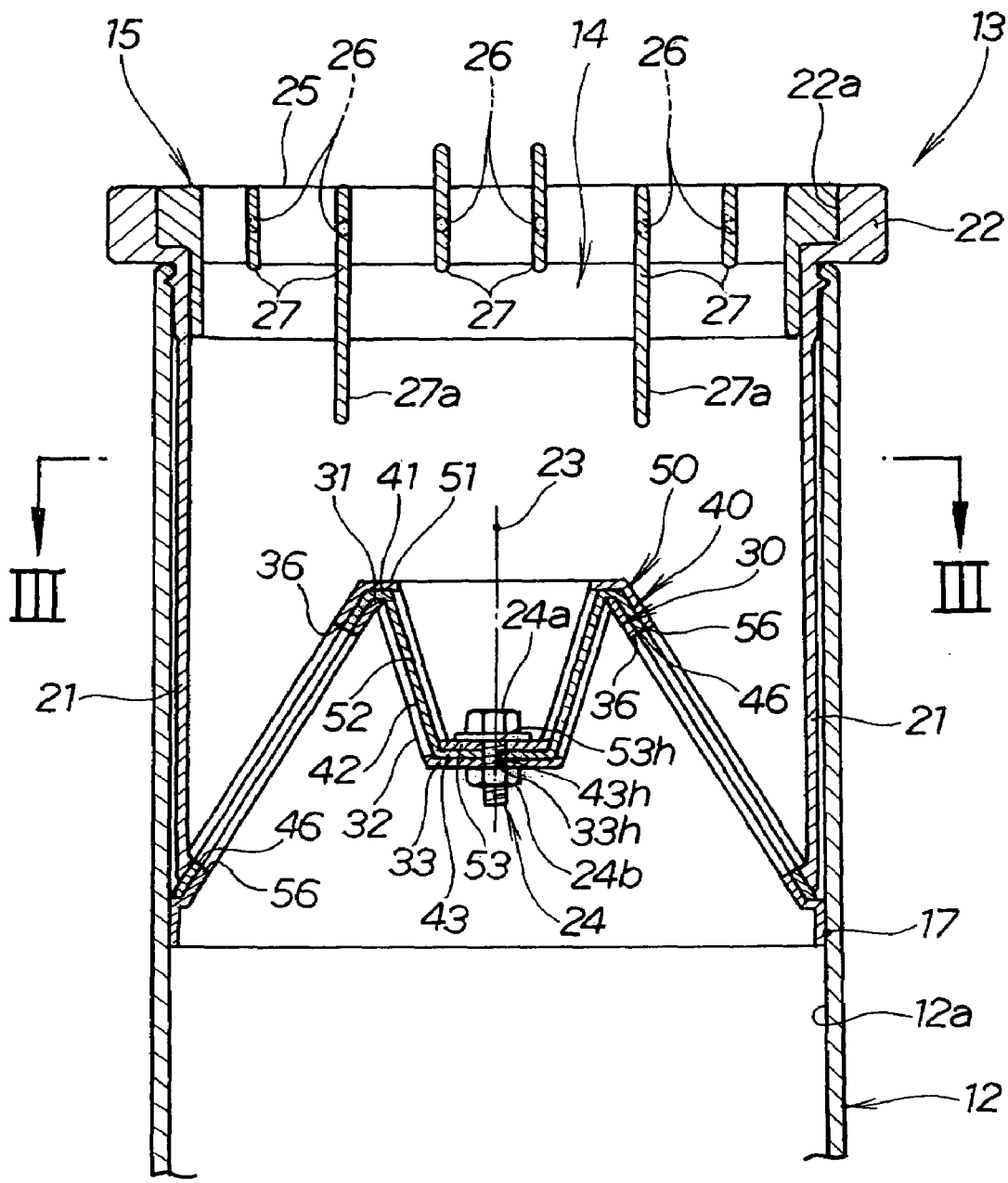
FIG. 2 is an enlarged view of a portion indicated by a circle II of FIG. 1.

The airflow regulator 13, as shown on enlarged scale in FIG. 2, generally comprises a plurality (three in the illustrated embodiment) of hollow frustoconical members 30, 40 and 50 placed one over another in a nested condition. Each of the frustoconical members 30, 40, 50 is open at opposite ends (i.e., a small end and a large end) thereof and has at least one (two in the illustrated embodiment) opening 36, 46, 56 formed in a sidewall thereof. The openings 36, 46, 56 are hereinafter referred to for clarity as "side openings". The innermost frustoconical member 30, which is disposed upstream of the other frustoconical members 40, 50 when viewed from a direction of flow of the temperature-controlled air, has an attachment portion 17 at the large end thereof, which is firmly connected to an inner surface 12a of the duct 12. The outermost frustoconical member 50, which is disposed downstream of the other frustoconical members 30, 40 when viewed from the direction of flow of the temperature-controlled air, has a pair of diametrically opposite connecting arms 21, 21 extending from the large end of the outermost frustoconical member 50 along the inner surface 12a of the duct 12 toward the air outlet 14. Upper ends of the connecting arms 21, 21 are integrally connected to an inner end of a flow regulating ring 22 rotatably mounted on the air outlet 14. The air deflector 15 is fitted in the flow regulating ring 22. The connecting arms 21 serve as a motion transfer means, which transfers a rotational motion of the flow regulating ring 22 to the outermost frustoconical member 50.

The frustoconical members 30, 40, 50 are substantially identical in structure and each have a generally U-shaped arm 32, 42, 52 extending from an end wall 31, 41, 51 at the small end (upper end in FIG. 2) toward the large end (lower end in FIG. 2) of each respective frustoconical member 30, 40, 50 and having a connecting portion 33, 43, 53 at a distal end thereof. The connecting portions 33, 43, 53 are disposed in alignment with the common central axis 23 of the frustoconical members 30, 40, 50 and connected together by a threaded fastener 24 such that the frustoconical members 30, 40, 50 including the respective connecting portions 33, 43, 53 are rotatable relative to one another about the common central axis 23 but not movable in an axial direction thereof.

More particularly, the connecting portions 33, 43, 53 have central holes 33h, 43h, 53h aligned with the common central axis 23 of the frustoconical members 30, 40, 50. The threaded fastener 24 comprises a bolt 24a and a nut 24b. The bolt 24a has an externally threaded shank extending through the central holes 33h, 43h, 53h of the connecting portions 33, 43, 53 and is threaded with the nut 24b to such an extent that the frustoconical members 30, 40, 50 cannot move in the axial direction thereof but are allowed to move in a circumferential direction relatively to one another about the common central axis 23. Since the frustoconical members 30, 40, 50 are connected together with the connecting portions 33, 43, 53 being superposed each other, there is no need to provide a separate means for preventing the frustoconical members 30, 40, 50 from moving relatively to one another in the axial direction thereof.

As described previously, the innermost frustoconical member 30 is secured at the attachment portion 17 to the inner surface 12a of the duct 12, and the outermost frustoconical member 50 is connected via the arms 21 to the flow regulating ring 22 rotatably mounted on the air outlet 14 of the duct 12. With this arrangement, when the flow regulating ring 22 is turned about its own axis, the outermost frustoconical member 50 turns relative to the innermost frustoconical member 30 about the common central axis 23 in the same direction as a direction of turning of the flow regulating ring 22. Angular movement of the outermost frustoconical member 50 relative to the innermost frustoconical member 30 changes the area of an opening of the airflow regulator 13, which is formed jointly by the side openings 36, 46, 56 of the respective frustoconical members 30, 40, 50. Thus, only by turning the flow regulating ring 22, it is possible to change a rate of flow and a velocity of the temperature controlled air supplied from the air outlet 14 of the duct 12 into the vehicle passenger compartment. The positional relationship between the innermost and outermost frustoconical members 30, 50 and the central frustoconical member 40 will be described later in greater detail.

The air deflector 15 includes a frame 25 and a series of deflection plates 27 pivotally mounted to the frame 25 by means of pivot pins 26. The deflection plates 27 are linked together so that when only one deflection plate 27 is moved in a direction, all other deflection plates 27 move simultaneously in the same direction. As shown in FIG. 2, two deflection plates 27a, 27a which are disposed substantially in axial alignment with a peripheral portion at the small end of the outermost frustoconical member 50 is extended deeper into the duct 12 than the remaining deflection plates to a position located near the peripheral portion at the small end of the outermost frustoconical member 50 for a purpose described later.

Figure 3:
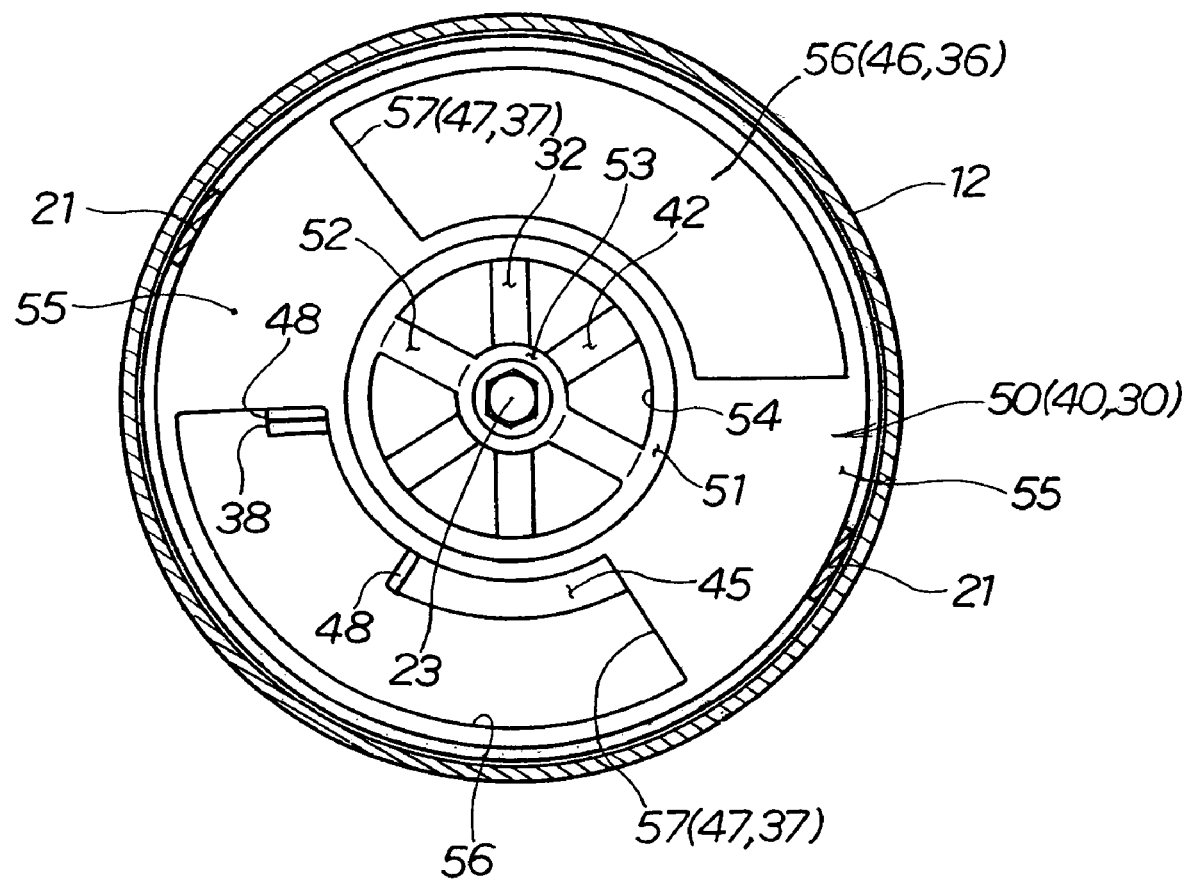
FIG. 3 is a cross-sectional view taken along the line III-III of FIG. 2.

FIG. 3 is a cross-sectional view taken along the line III-III of FIG. 2. As shown in this figure, the frustoconical members 50, 40, 30 each have two side openings 56, 46, 36 disposed in diametrically opposite relation and symmetrical with respect to each other about the common central axis 23 of the frustoconical members 50, 40, 30. In FIG. 3, the frustoconical members 50, 40, 30 lapped over one another are disposed in a fully open position in which the side openings 56, 46, 36 of the respective frustoconical members 50, 40, 50 are fully opened with peripheral edges 57, 47, 37 of the respective openings 56, 46, 36 aligned with each other in the axial direction of the frustoconical members 50, 40, 30. In this fully open position, the generally U-shaped arms 52, 42, 32 of the frustoconical members 50, 40, 30 are arranged 60 degrees out of phase with each other about the common central axis 23 so that a circular opening 54 formed at the small end of the outermost frustoconical member 50 is partly closed by the arms 52, 42, 32 of the frustoconical members 50, 40, 30. The opening 54 is hereinafter referred to for clarity as "end opening". When the frustoconical members 50, 40, 30 are disposed in the fully open position shown in FIG. 3, the end opening 54 has a minimum area.

Reference numeral 48 shown in FIG. 3 denotes an engagement portion comprising a lug disposed at the peripheral edge 47 of one side opening 46 of the central frustoconical member 40 and projecting outward from the sidewall 45 of the central frustoconical member 40. The central frustoconical member 40 has two such engagement portions or lugs 48, 48 spaced in a circumferential direction of the frustoconical member 40. Numeral 38 denotes an engagement portion or lug disposed at the peripheral edge 37 of one side opening 36 of the innermost frustoconical member 30 and projecting outward from the sidewall 35 (FIG. 4) of the frustoconical member 30. One engagement lug 48 of the central frustoconical member 40 is in interlocking engagement with the peripheral edge 57 of the side opening 56 of the outermost frustoconical member 50, and the other engagement lug 48 of the central frustoconical member 40 is located at a center of the side opening 56 of the outermost frustoconical member 50 when viewed in the circumferential direction of the frustoconical members 50, 40, 30. The engagement lug 38 of the innermost frustoconical member 30 is also in interlocking engagement with the peripheral edge 57 of the side opening 56 of the outermost frustoconical member 50 via the aforesaid one engagement lug 48 of the central frustoconical member 40. Operation of the engagement lugs 38, 48 will be described later in greater detail.

Figure 4:
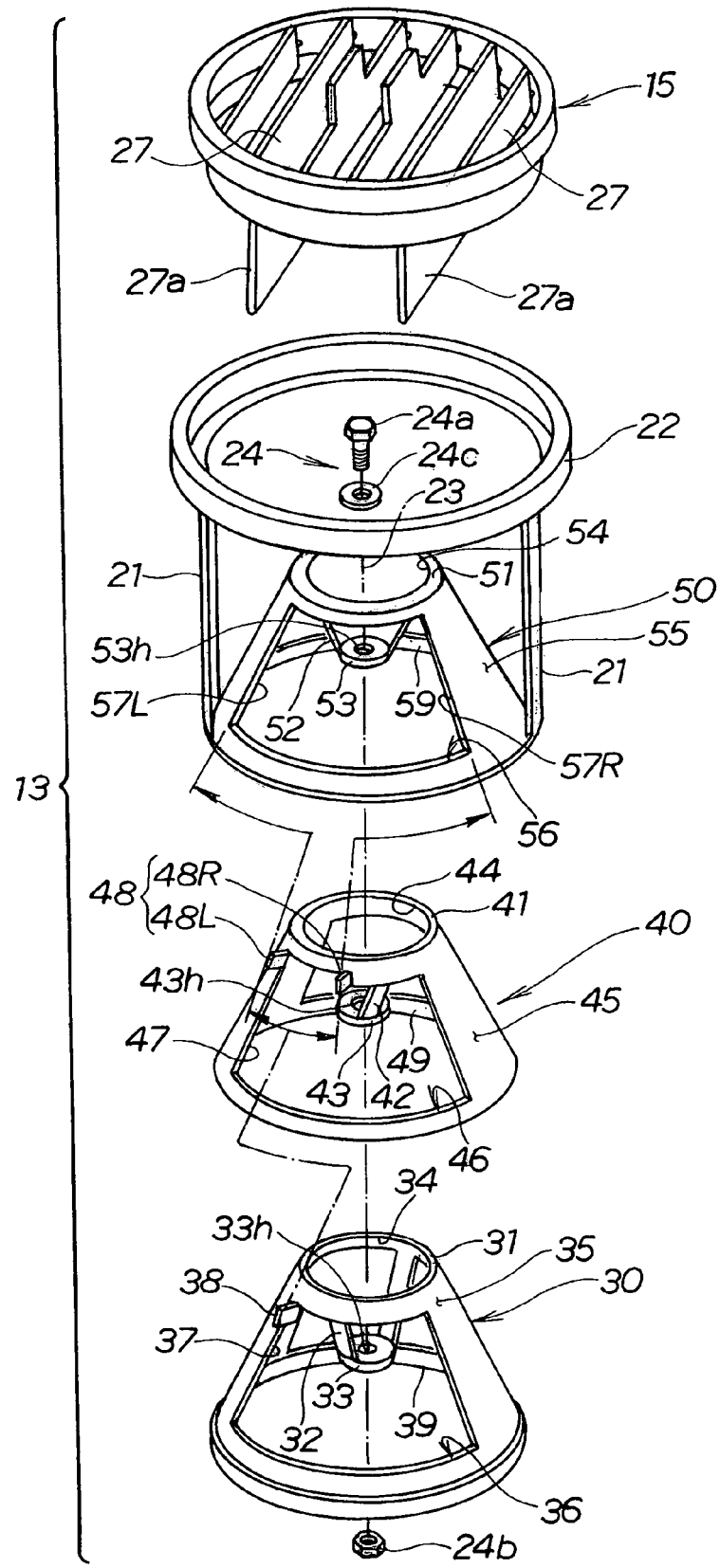
FIG. 4 is an exploded perspective view of an airflow regulator according to an embodiment of the present invention.

FIG. 4 is an exploded perspective view of the airflow regulator 13 according to an embodiment of the present invention. As shown in this figure, the engagement lug 38 of the innermost frustoconical member 30 is disposed at a side edge of the side opening 36 and located near an opening 34 at the small end of the innermost frustoconical member 30. Similarly, the engagement lugs 48 of the central frustoconical member 40 are disposed at the peripheral edge 47 of the side opening 46 and located near an opening 44 at the small end of the central frustoconical member 40. More particularly, one engagement lug 48L is disposed at a side edge of the side opening 46, and the other engagement lug 48R is disposed at an end edge (upper end edge in FIG. 4) of the side opening 46 and located centrally between the opposite side edges of the side opening 46. The engagement lugs 48L and 48R are thus spaced in the circumferential direction of the central frustoconical member 40 by a distance which is half the distance between the opposite side edges of the side opening 46.

In an assembled condition of the airflow regulator 13, the engagement lug 38 of the innermost frustoconical member 30 is disposed between the engagement lugs 48L, 48R of the central frustoconical member 40. Thus, the engagement lugs 48L, 48R defines a range of angular movement of the central frustoconical member 40 relative to the innermost frustoconical member 30. Furthermore, the engagement lugs 48L, 48R are received in the side opening 56 of the outermost frustoconical member 50. Thus, the engagement lug 48L is engaged with one side edge 57L of the side opening 56 of the outermost frustoconical member 50 to define one end of a range of angular movement of the outermost frustoconical member 50 relative to the central frustoconical member 40, while the engagement lug 48R is engaged with an opposite side edge 57R of the side opening 56 of the outermost frustoconical member 50 to define the other end of the range of angular movement of the outermost frustoconical member 50 relative to the central frustoconical member 40.

Reference character 24c shown in FIG. 4 denotes a washer disposed between a head of the bolt 24a and the connecting portion 53 of the outermost frustoconical member 50. Although in the illustrated embodiment, the airflow regulator 13 has three frustoconical members 30, 40, 50, two or four frustoconical members may be used to form the airflow regulator 13. Furthermore, the number of the side openings 36, 46, 56 should by no means be limited to two in the illustrated embodiment but one or more than two side openings may be formed in each frustoconical member 30, 40, 50. Additionally, in the illustrated embodiment, the respective side openings 36, 46, 56 of the frustoconical members 30, 40, 50 have substantially the same area, but they may be configured to have different areas.

Figure 5A:
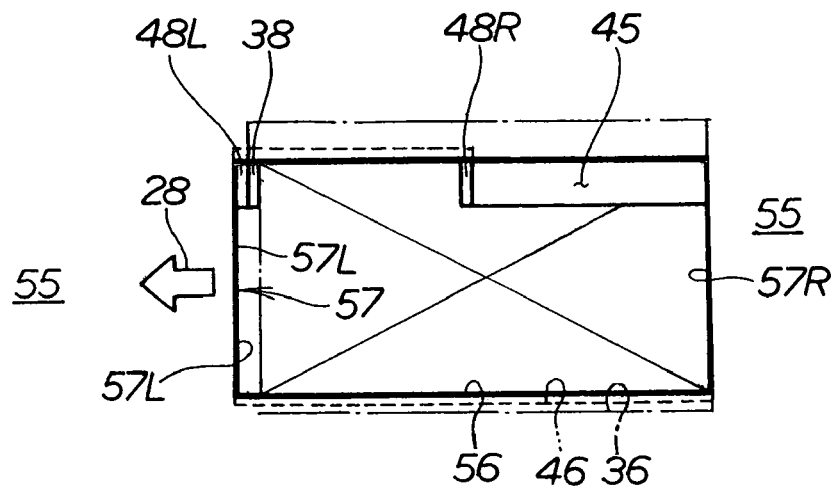
FIGS. 5A to FIG. 5C are development views illustrative of the manner in which the area of an opening formed jointly by respective side openings of three frustoconical members changes as two of the frustoconical members move relatively to the remaining frustoconical member in one direction from a fully open position to a fully closed position.
Figure 5B:
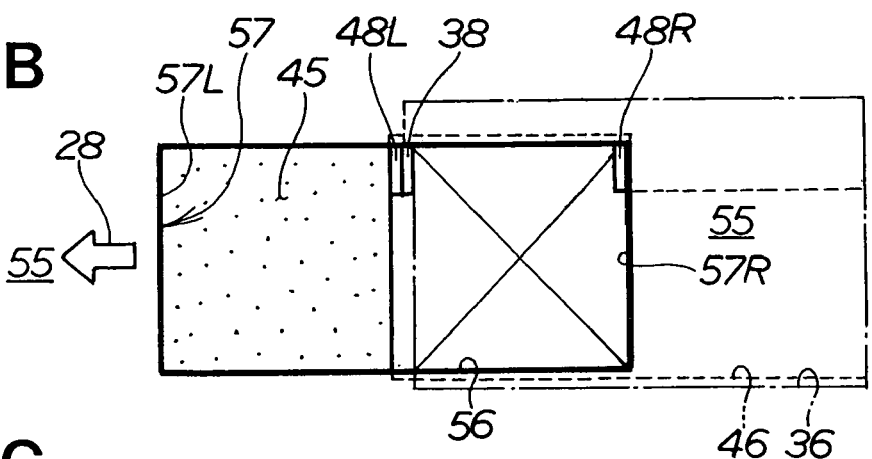
Figure 5C:
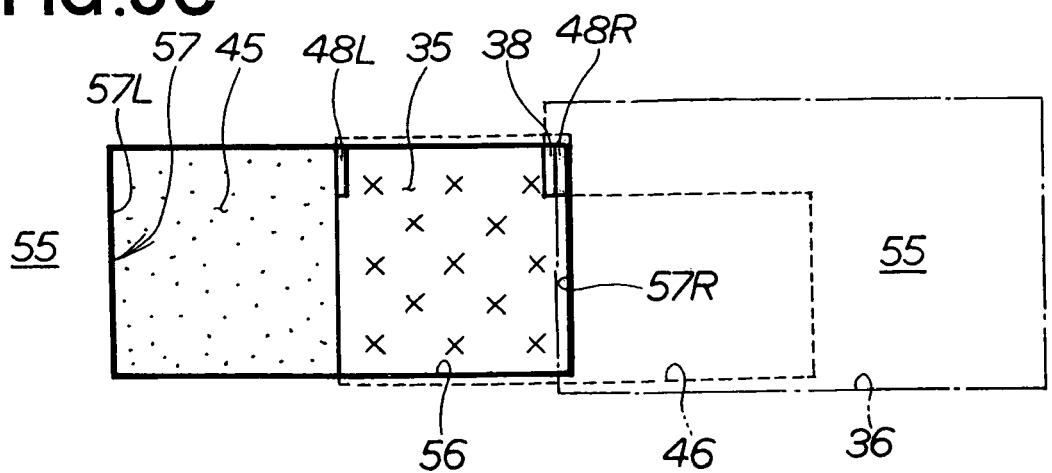

FIGS. 5A to 5C are development views illustrative of the manner in which the area of an opening formed jointly by the side openings 36, 46, 56 of the respective frustoconical members 30, 40, 50 changes as the outermost and central frustoconical members 50, 40 move relative to the innermost frustoconical member 30 in one direction through the action of the engagement lugs 38, 48L, 48R and the side edges 57L, 57R. For better understanding, the side openings 36, 46, 56 are shown as having a rectangular form and a different size. For purposes of illustration, description begins with the parts shown in FIG. 5A where the frustoconical members 30, 40, 50 (FIG. 4) are disposed in the fully open position in which the side openings 36, 46, 56 are radially aligned and hence fully open. In this fully open position, one side edge 57L (left side edge in FIG. 5A) of the side opening 56 is in interlocking engagement with one engagement lug 48L (left lug in FIG. 5A) of the central frustoconical member 40 (FIG. 4), and the engagement lug 48L is held between the side edge 57L and the engagement lug 38 of the innermost frustoconical member 30 (FIG. 4). The other engagement lug 48R of the central frustoconical member 40 is disposed centrally between the opposite side edges 57L, 57R of the side opening 56 of the outermost frustoconical member 50.

When the flow regulating ring 22 shown in FIGS. 2 and 4 is turned in a direction to angularly move the outermost frustoconical member 50 (FIG. 4) about the common central axis 23 in the same direction of the flow regulating ring 22 (the direction being indicated by the arrow 28 shown in FIG. 5A). With this angular movement or turning of the outermost frustoconical member 50, the side edge 57R of its opening 56 comes into contact with the engagement lug 48R of the central frustoconical member 40, as shown in FIG. 5B. In this instance, a leading half part (left half part in FIG. 5B) of the side opening 56 is located above a part of the sidewall 45 (shown with dots added for clarity) of the central frustoconical member 40 with the result that the side opening 56 of the outermost frustoconical member 50 is half closed by the sidewall 45 of the central frustoconical member 40. At the same time, respective trailing half parts (right half parts in FIG. 5B) of the side openings 46, 36 of the central and innermost frustoconical members 40, 30 are closed by the sidewall 55 of the frustoconical member 50. Thus, the opening of the airflow regulator 13 (FIG. 4), which is formed jointly by the respective side openings 36, 46, 56 of the frustoconical members 30, 40, 50, assumes a half open position.

As the flow regulating ring 22 (FIGS. 2 and 4) is further turned in the same direction, the side edge 57R of the side opening 56 of the outermost frustoconical member 50 further moves in the direction of the arrow 28, forcing the engagement lug 48R of the central frustoconical member 40 to move in the same direction. Movement of the engagement lug 48R and the central frustoconical member 40 terminates when the engagement lug 48R comes in abutment with the engagement lug 38 of the fixed innermost frustoconical member 30, as shown in FIG. 5C. In this instance, the leading half part (left half part in FIG. 5C) of the side opening 56 of the outermost frustoconical member 50 remains closed by the sidewall 45 of the central frustoconical member 40, and the trailing half part (right half part in FIG. 5C) lies over a trailing half part (left half part in FIG. 5C) of the side opening 46 of the central frustoconical member 40 and is disposed above a part of the sidewall 35 (shown with crosses added for clarity) of the innermost frustoconical member 30. Thus, the side opening 56 of the outermost frustoconical member 50 is fully closed. At the same time, a trailing half part (right half part in FIG. 5C) of the side opening 46 of the central frustoconical member 40 and the entire area of the opening 36 of the innermost frustoconical member 30 are closed by a part of the sidewall 55 of the outermost frustoconical member 50. Thus, the openings 36, 46, 56 formed in the sidewalls 35, 45, 55 of the frustoconical members 30, 40, 50 are fully closed, and the opening of the airflow regulator 13 (FIG. 4), which are formed jointly by the side openings 36, 46, 56, assumes a fully closed position.

In this fully closed position shown in FIG. 5C, since the side edge 57R of the side opening 56 of the outermost frustoconical member 50 (FIG. 4) is in abutment with the engagement lug 48R of the central frustoconical member 40 and since the engagement lug 48R is held in abutment with the engagement lug 38 of the fixed innermost frustoconical member 30, further movement of the outermost and central frustoconical members 50, 40 relative to the fixed innermost frustoconical member 530 in the direction of the arrow 28 is not possible. Thus, the engagement lug 38 on the fixed innermost frustoconical member 30 serves also as a stopper.

Figure 6A:
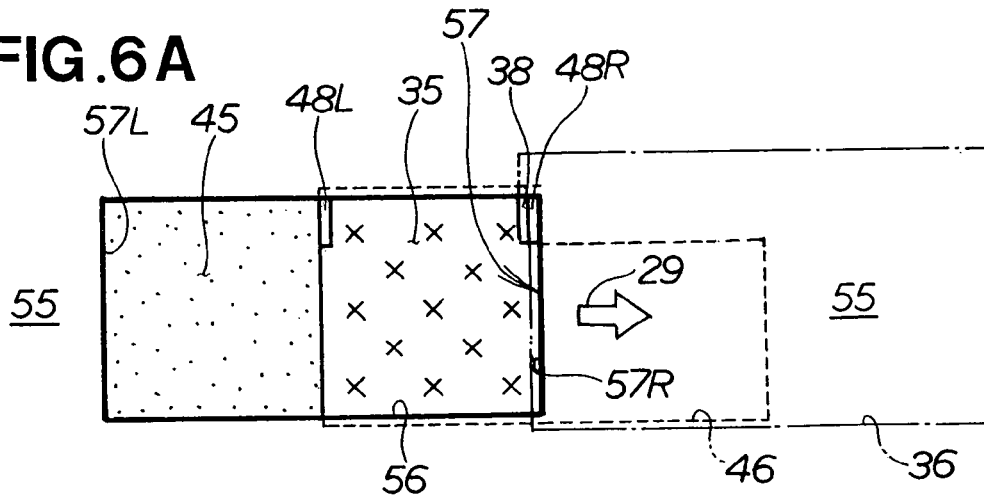
FIGS. 6A to FIG. 6C are development views illustrative of the manner in which the area of the opening formed jointly by the respective side openings of the frustoconical members changes as the two frustoconical members move relatively to the remaining frustoconical member in an opposite direction from the fully closed position to the fully open position.
Figure 6B:
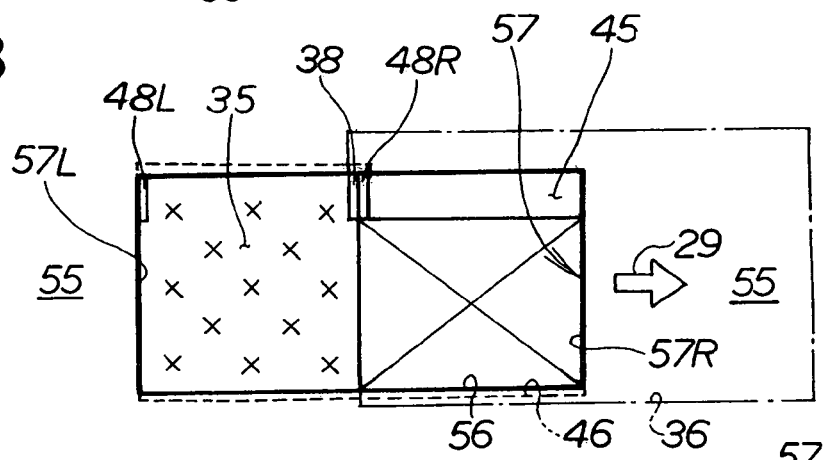

Then the flow regulating ring 22 shown in FIGS. 2 and 4 is turned in the opposite direction whereupon the side edges 57L, 57R of the side opening 56 of the outermost frustoconical member 50 (FIG. 4) move in a direction indicated by the arrow 29 shown in FIG. 6A. With this movement, the side edge 57L of the side opening 56 comes into interlocking engagement with the engagement lug 48L of the central frustoconical member 50, as shown in FIG. 6B. In this instance, a leading half part (right half part in FIG. 6B) of the side opening 56 of the outermost frustoconical member 50 lies over a leading half part (right half part in FIG. 6B) of the side opening 46 of the central frustoconical member 40 and a trailing half part (left half part in FIG. 6B) of the side opening 36 of the innermost frustoconical member 30 while a trailing half part (left half part in FIG. 6B) of the side opening 56 still remains closed by the sidewall 35 of the innermost frustoconical member 30. Thus, the opening of the airflow regulator 13 (FIG. 4), which is formed jointly by the side openings 36, 46, 56 of the frustoconical members 30, 40, 50, again assumes the half open position.

Figure 6C:
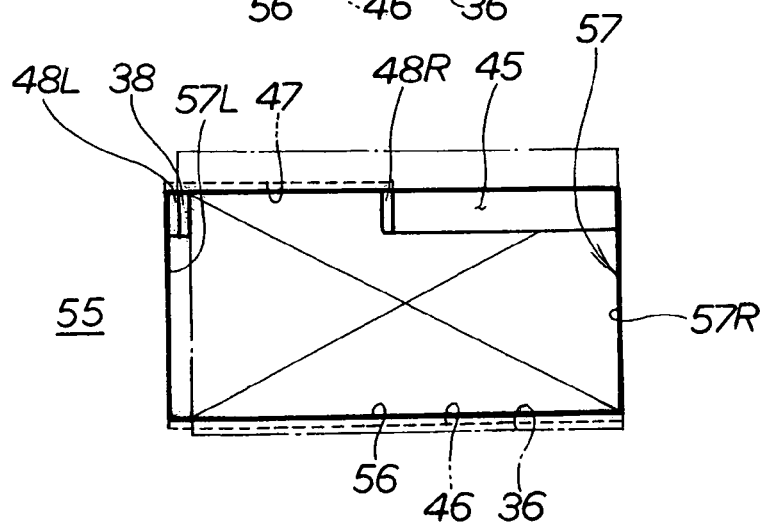

As the flow regulating ring 22 (FIGS. 2 and 4) is further turned in the same direction, the side edge 57L of the side opening 56 of the outermost frustoconical member 50 further moves in the direction of the arrow 29, forcing the engagement lug 48L of the central frustoconical member 40 to move in the same direction as the outermost frustoconical member 30. Movement of the engagement lug 48L and the central frustoconical member 40 terminates when the engagement lug 48L comes in abutment with the engagement lug 38 of the fixed innermost frustoconical member 30, as shown in FIG. 6C. In this instance, the openings 50, 40, 30 are aligned with each other and hence assume the fully open position. Movement of the outermost and central frustoconical members 50, 50 relative to the fixed innermost frustoconical member 30 in the direction of arrow 29 is prevented by the engagement lug 38 of the fixed innermost frustoconical member 30.

It will be appreciated that through interlocking engagement between each side edge 57L, 57R and a mating one of the engagement lugs 48L, 48R, a rotational power produced by turning the flow regulating ring 22 can be transmitted from the outermost frustoconical member 50 to the central frustoconical member 40, causing the central frustoconical member 40 to angularly move or turn together with the outermost frustoconical member 50 within a predetermined range of angular distance which is substantially equal to an angular distance between the engagement lugs 48L, 48R. The engagement lug 38 on the fixed innermost frustoconical member 30 is disposed between the engagement lugs 48L, 48R for interlocking engagement with one of the engagement lugs 48L, 48R to stop movement of the outermost and central frustoconical members 50, 40 in either direction.

Figure 7A:
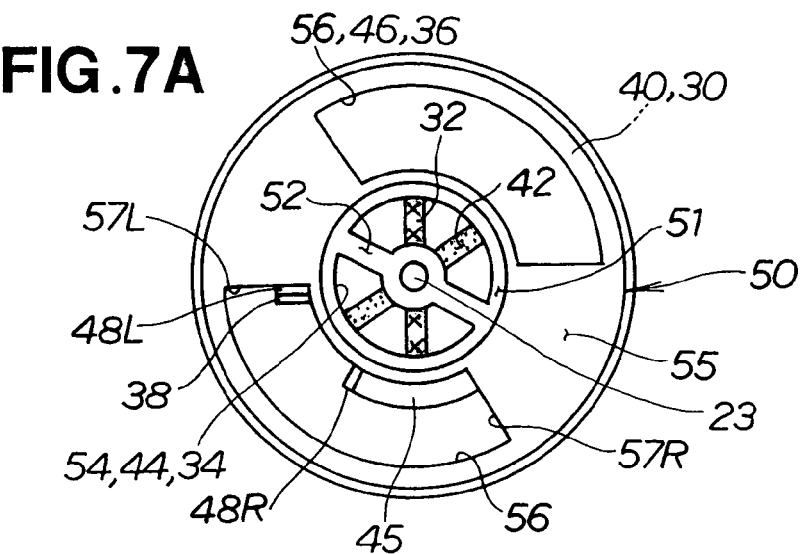
FIGS. 7A to 7C are plan views showing the frustoconical members as they are disposed in three different positions to achieve the opening areas shown in FIGS. 5A to 5C, respectively.
Figure 7B:
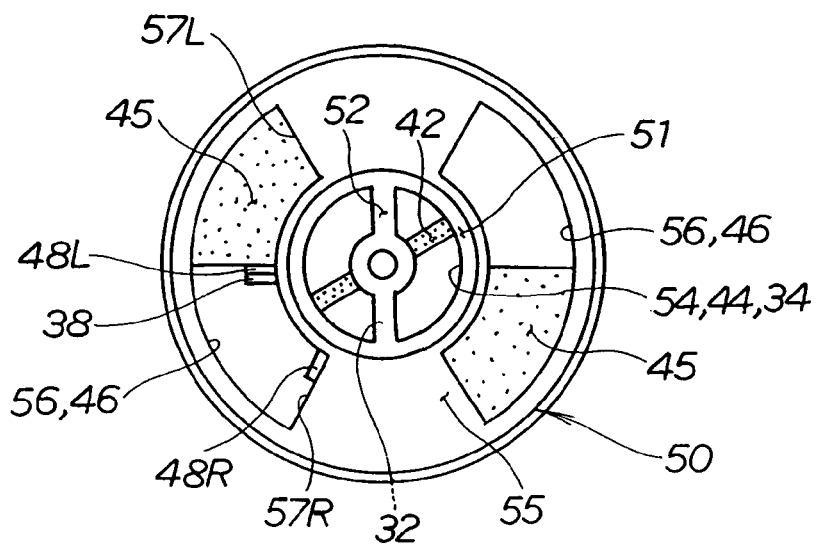
Figure 7C:
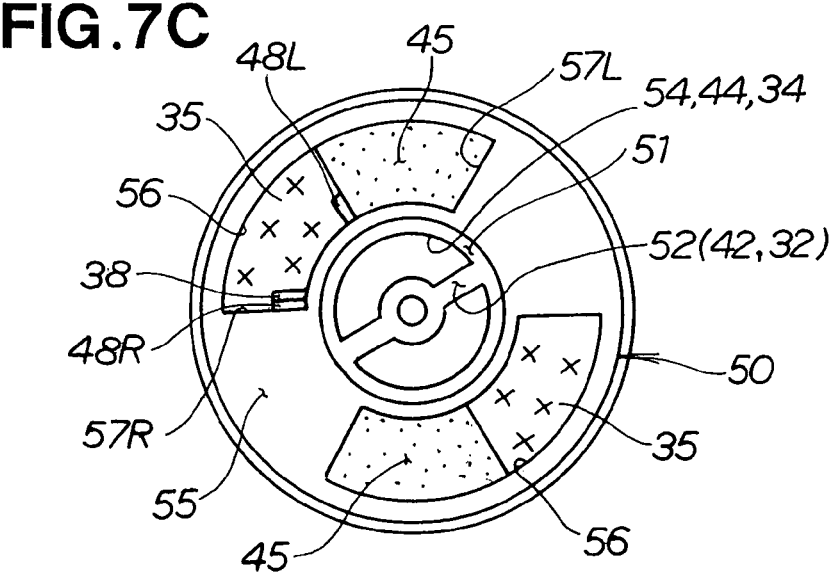

FIGS. 7A to 7C are top plan views illustrative of the manner in which both the area of the end opening 54 and the area of the opening formed jointly by the respective side openings 36, 46, 56 of the frustoconical members 30, 40, 50 can be varied in response to turning of the outermost frustoconical member 50.

As shown in FIG. 7A, the opening formed jointly by the respective side openings 56, 46, 36 on each of the diametrically opposite sides of the frustoconical members 50, 40, 30 is disposed in the fully open position corresponding to the position shown in FIG. 5A. In this position, the respective legs 52, 42, 32 of the frustoconical members 50, 40, 30 are 60 degree out of phase with respect to one another about the common central axis 23 of the frustoconical members 50, 40, 30. Since the arms 52, 42, 32 extend diametrically across the respective end openings 54, 44, 34 of the frustoconical members 50, 40, 30, the arms 52, 42, 32 in the illustrated position provide a maximum resistance to a flow of air passing through an opening of the airflow regulator (FIG. 4) which is formed jointly by the end openings 52, 42, 32 of the frustoconical members 50, 40, 30. With this maximum resistance to the airflow, the rate of flow of air supplied from openings formed jointly by the side openings 56, 46, 36 of the frustoconical members 50, 40, 30 increases. Additionally, in the position shown in FIG. 7A, the opening formed jointly by the end openings 54, 44, 34 of the frustoconical members 50, 40, 30 has a minimum area while the opening formed jointly by the side openings 56, 46, 36 has a maximum area. Thus, the position of FIG. 7A is particularly suitable when the airflow regulator 13 (FIG. 4) operates in a wide mode (or diffuser mode) in which air is blown out from the entire project area of a conical assembly formed by the frustoconical members 50, 40, 30.

FIG. 7B shows a condition corresponding to the half-open position of the side openings 56, 46, 36 shown in FIG. 5B. In this condition, the arm 52 of the outermost frustoconical member 50 lies directly over the leg 32 of the innermost frustoconical member 30 so that the area of the opening formed jointly by the end openings 54, 44, 34 becomes larger than that in the condition shown in FIG. 7A.

The condition shown in FIG. 7C corresponds to the fully closed position of the side openings 56, 46, 36 shown in FIG. 5C. In this condition, the arms 52, 42, 32 of the frustoconical members 50, 40, 30 are overlapped with each other so that the area of the opening formed jointly by the end openings 54, 44, 34 becomes larger than that in the condition shown in FIG. 7B. In other words, the opening of the airflow regulator 13, which is formed jointly by the side openings 56, 46, 36 of the frustoconical members 50, 40, 30, has a minimum area, while the opening, which is formed jointly by the end openings 54, 44, 34, has a maximum area. Thus, the position of FIG. 7C is particularly suitable when the airflow regulator 13 (FIG. 4) operates in a spot mode in which air is blown out from the opening formed jointly by the end openings 54, 44, 34 of the frustoconical members 50, 40, 30. Since the arms 52, 42, 32 are superposed in the axial direction of the frustoconical members 50, 40, 30, it is possible to reduce the loss in the rate of flow and velocity of air passing through the end openings 54, 44, 34 of the frustoconical members 50, 40, 30 during the spot mode operation of the airflow regulator 13 (FIG. 4).

As thus far described, the airflow regulator 13 according to one embodiment of the present invention includes two or more hollow frustoconical members 30, 40, 50 placed one over another in nested condition. Each of the frustoconical members 30, 40, 50 is open at a small end and a large end thereof and having at least one side opening 36, 46, 56 formed in a sidewall 55, 45, 35 thereof. The frustoconical members 30, 40, 50 are rotatable relative to one another about a common central axis thereof. With this arrangement, when the frustoconical members 30, 40, 50 are turned relative to one another about the common central axis thereof to the extent that the side openings 36, 46, 56 formed in the sidewalls 35, 45, 55 of the respective frustoconical members 30, 40, 50 are aligned together in a radial direction of the frustoconical members 30, 40, 50, an opening formed jointly by the side openings 36, 46, 56 assumes a fully open position. Alternatively, when the frustoconical members 30, 40, 50 are turned relative to one another about the common central axis to the extent that the side opening 36, 46, 56 of one frustoconical member 30, 40, 50 is fully closed by the sidewall 35, 45, 55 of the adjacent frustoconical member, the opening formed jointly by the side openings 36, 46, 56 assumes a fully closed position.

Thus by properly adjusting an amount of angular movement between the adjacent frustoconical members, it is possible to freely vary the area of the opening formed jointly by the side openings 36, 46, 56 of the frustoconical members 30, 40, 50. Consequently, the rate of flow and the velocity of air supplied from the opening can be regulated as desired.

Furthermore, the airflow regulator 13 formed essentially by a plurality of hollow frustoconical members 30, 40, 50 placed or lapped one above another is simple in construction, has a relatively small number of components and compact in size. By using the frustoconical members 30, 40, 50, the airflow regulator 13 can be installed in the duct 12 (FIG. 2) without requiring an airflow passage formed in a radial direction of the airflow regulator 13, which will increase the overall size of the duct.

Figure 8A:
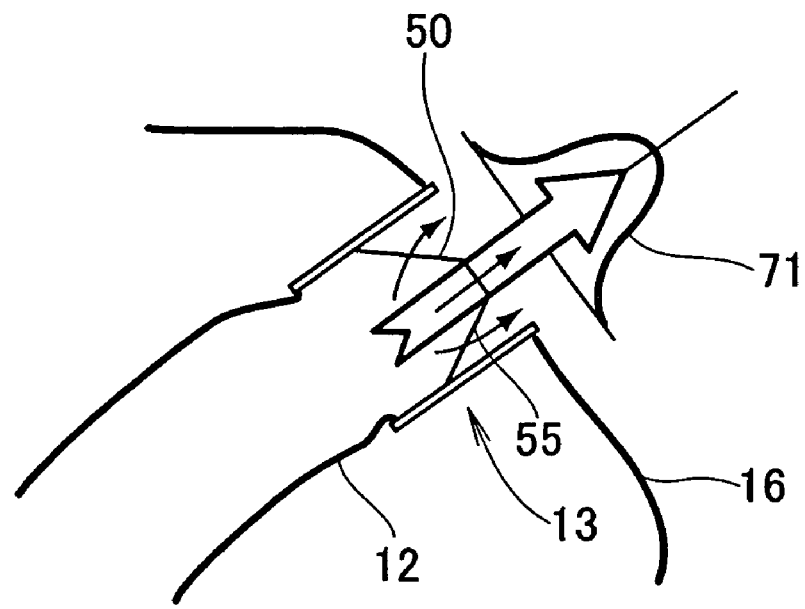
FIGS. 8A and 8B show for comparative purposes a wind speed distribution curve obtained during a wide mode operation and a wind speed distribution curve obtained during a spot mode operation, respectively, of the airflow regulator.
Figure 8B:
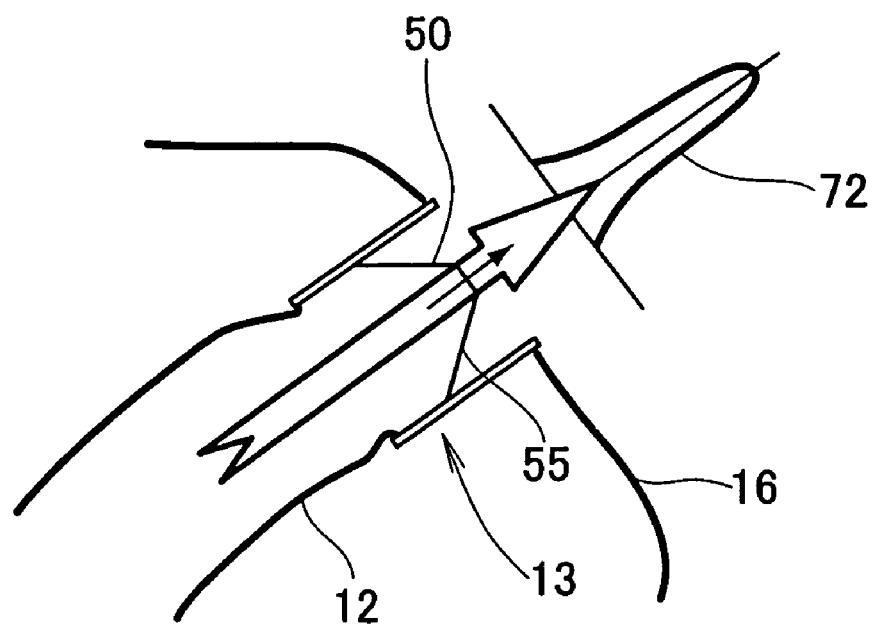

FIGS. 8A and 8B diagrammatically show for comparative purposes a wind speed distribution curve 71 obtained during the wide mode operation and a wind speed distribution curve 72 obtained during the spot mode operation, respectively, of the airflow regulator 13. In the wide mode operation shown in FIG. 8A, air is blown out from both an opening formed jointly by the respective end openings of the frustoconical members (only the outermost one 50 being shown) and openings formed jointly by the openings formed in the respective sidewalls (only the outermost one 55 being shown) of the frustoconical members so that the flow rate and the speed of air supplied from both openings are balanced.

On the other hand, in the spot mode operation shown in FIG. 8B, air is blown out only from the opening at a small end of an assembly of the plural frustoconical members (only the outermost one 50 being shown) so that the speed of air blown out from the airflow regulator 13 is higher than the wind speed achieved during the wide mode operation (the wind speed distribution curve 72 shown in FIG. 8B is narrower in width than that 71 shown in FIG. 8A). Thus, in the spot mode operation, the opening of the airflow regulator 13 is selected with the priority assigned to the wind speed. The spot mode is particularly effective when used with a car with an open roof (i.e., convertible) or a car with a sunroof because a stream of temperature controlled air can be directed at a high speed onto a desired position even when the roof/sunroof is open to allow outside air to flow into the passenger compartment. By using the spot mode, it is possible to improve the comfort without increasing the capacity of the air-conditioner. This contributes to reduction of fuel consumption.

FIGS. 9A to 9C are cross-sectional views showing the operation of the air deflector 15 used in combination of the spot mode operation of the airflow regulator 13. As discussed previously, the deflecting plates 27a, which are disposed in alignment with a peripheral portion at the small end of the outermost frustoconical member 50, are extended deeper into the duct 12 than the remaining deflection plates 27 to a position located near the peripheral portion at the small end of the outermost frustoconical member 50. This arrangement is particularly advantageous when used in combination with the spot mode operation of the airflow regulator 13 because the thus extended deflecting plates 27a can reliably and efficiently guide air blown out from the small end of the outermost frustoconical member 50, toward any desired direction by properly adjusting an angle of the deflecting plates 27, 27a with respect to the common central axis 23 of the frustoconical members (only the outermost one 50 being designated), as shown in FIGS. 9A-9C. By thus guiding the deflecting plates 27, 27a, the air blown out from the airflow regulator 13 can reach a desired location without loss of the flow rate and velocity thereof. It will readily be understood that the air deflector 15 can also operate efficiently even when the airflow regulator 13 operates in the wide mode.

Figure 10:
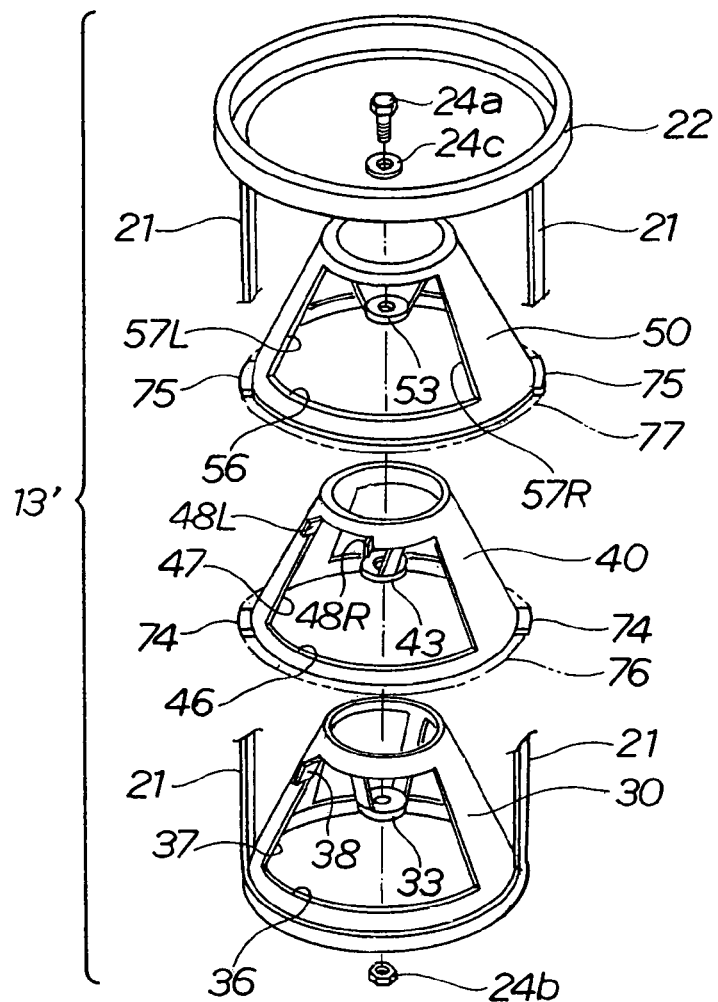
FIG. 10 is a view similar to FIG. 4, but showing an airflow regulator according to another embodiment of the present invention.

FIG. 10 shows in exploded perspective view an airflow regulator 13' according to another embodiment of the present invention. The airflow regulator 13' differs from the airflow regulator 13 of the first embodiment shown in FIG. 4 in that the flow regulating ring 22 is connected to the large end of the innermost frustoconical member 30 by a pair of connecting arms 21, and the outermost frustoconical member 50 is firmly connected at its large end to the inner surface 12a (FIG. 2) of the duct 12. Respective outer circumferential edges 75, 74 of the outermost and central frustoconical members 50, 40 are cutout or recessed as at 77, 76 for allowing movement of the connecting arms 21 in a circumferential direction of the airflow regulator 13'. In this embodiment, the connecting arms 21 serve as a motion transfer means, which transfers a rotational motion of the flow regulating ring 22 to the innermost frustoconical member 30.

Figure 11:
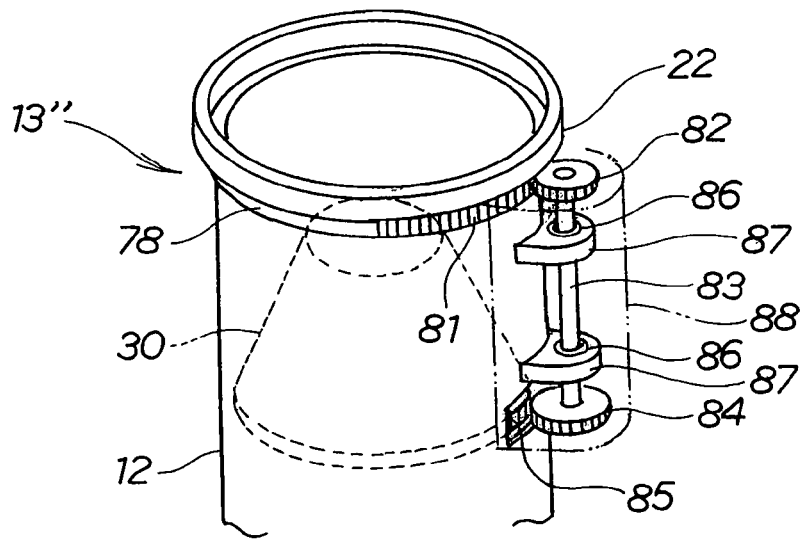
FIG. 11 is a schematic perspective view showing an airflow regulator according to still another embodiment of the present invention.
Figure 12:
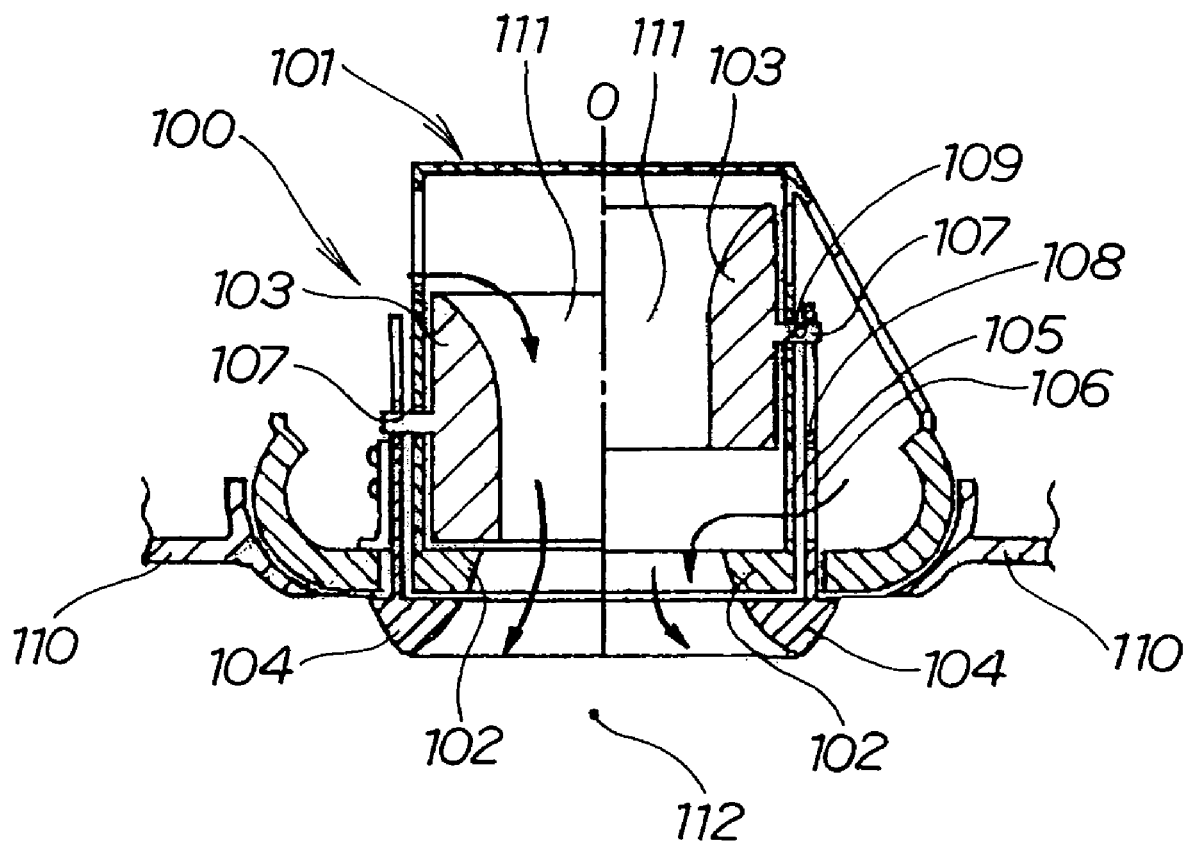
FIG. 12 is a cross-sectional view showing an air blowout unit as an airflow regulator of a known vehicle air-conditioner.

FIG. 11 shows in perspective an airflow regulator 13" according to still another embodiment of the present invention. The airflow regulator 13" differs from the airflow regulator 13' of the embodiment shown in FIG. 10 in that the motion transfer means comprises a toothed portion 22 formed on an outer circumferential surface along at least part of the full circumference of the flow regulating ring 22, a first small gear 82 meshing with the toothed portion 22 of the flow regulating ring 22 and connected to one end of a shaft 83 for rotation therewith, a second small gear 84 connected to an opposite end of the shaft 83 for rotation therewith, and a toothed portion 85 formed on an outer circumferential surface of the innermost frustoconical member 30 along at least part of the full circumference of the frustoconical member 30 and meshing with the second small gear 84. The shaft 83 disposed outside the duct 12 and rotatably mounted via bearings 86 on a pair of brackets 87, 87 secured to an outer surface of the duct 12. Those parts 82, 83, 84, 86, 87 disposed outside the duct 12 are covered by a cover 88.

Although in the illustrated embodiment, the air-conditioner of the present invention is described as being used in a vehicle, it can also effectively operate when used as a spot cooler generally used in a building.

Obviously, various minor changes and modifications of the present invention are possible in the light of the above teaching. It is therefore to be understood that within the scope of the appended claims the invention may be practiced otherwise than as specifically described.

What is claimed is:

1. An air-conditioner for a vehicle, comprising:
   an air-conditioning unit for controlling the temperature of air at a desired value;
   a duct for guiding the temperature-controlled air toward a passenger compartment of the vehicle; and
   an airflow regulator disposed in the duct for regulating a rate of flow of the temperature-controlled air to be discharged from the duct, the airflow regulator comprising a plurality of hollow frustoconical members placed one over another in a nested condition, each of the frustoconical members being open at and through a small end and a large end thereof, the small end being disposed near an air outlet of the duct and the large end being disposed relatively remote from the duct air outlet, such that the small end is downstream of the large end in a direction of air flow, each of said frustoconical members having at least one opening formed in a sidewall thereof, the frustoconical members being rotatable relative to one another about a common central axis thereof,
   wherein the small end is defined by a small end surface perpendicular to the common central axis of the frustoconical members, and the large end is defined by a large end surface parallel to the small end surface, said small end surface and said large end surface being open to allow air to flow therethrough.

2. An air-conditioner for a vehicle, comprising:
   an air-conditioning unit for controlling the temperature of air at a desired value;
   a duct for guiding the temperature-controlled air toward a passenger compartment of the vehicle; and
   an airflow regulator disposed in the duct for regulating a rate of flow of the temperature-controlled air to be discharged from the duct, the airflow regulator comprising a plurality of hollow frustoconical members placed one over another in a nested condition, each of the frustoconical members being open at a small end and a large end thereof, the small end being disposed near an air outlet of the duct and the large end being disposed relatively remote from the duct air outlet, such that the small end is downstream of the large end in a direction of air flow, and having at least one opening formed in a sidewall thereof, the frustoconical members being rotatable relative to one another about a common central axis thereof, and
   further including an air deflector provided on the air outlet of the duct, wherein the airflow regulator is disposed behind the air deflector, the air deflector has a series of deflection plates, and a part of the deflection plates which is disposed in alignment with a peripheral portion at the small end of an outermost frustoconical member of the plural frustoconical members in a direction parallel to the common central axis of the frustoconical members is extended deeper into the duct than the remaining deflection plates to a position located near the peripheral portion at the small end of the outermost frustoconical member.

3. The air-conditioner according to claim 1, wherein one of the frustoconical members has an engagement portion disposed on a peripheral edge of the opening in the sidewall thereof, the engagement portion being engageable with a peripheral edge of the opening in the sidewall of an adjacent one of the frustoconical members to move the adjacent frustoconical member together with the one frustoconical member when the one frustoconical member rotates relative to the adjacent frustoconical member about the common central axis.

4. The air-conditioner according to claim 1, further including a flow regulating ring rotatably mounted on an air outlet of the duct, wherein the airflow regulator is disposed behind the air outlet, and the flow regulating ring is connected to one of an outermost frustoconical member and an innermost frustoconical member of the plural frustoconical members, the other of the outermost frustoconical member and an innermost frustoconical member being secured to an inner surface of the duct.

5. The air-conditioner according to claim 4, further including motion transfer means for transferring a rotational motion of the flow regulating ring to the one frustoconical member, wherein the motion transfer means comprises at least one connector arm disposed inside the duct and formed integrally with the flow regulating ring and the one frustoconical member.

6. The air-conditioner according to claim 4, further including a motion transfer means for transferring a rotational motion of the flow regulating ring to the one frustoconical member, wherein the motion transfer means comprises a toothed portion formed on an outer circumferential surface of the flow regulating ring along at least part of the full circumference thereof, a first gear meshing with the toothed portion of the flow regulating ring and secured to a shaft rotatably mounted on an outer surface of the duct, a second gear secured to the shaft, and a tooth portion formed on an outer circumferential surface of the one frustoconical member along at least part of the full circumference thereof and meshing with the second gear.

7. An air-conditioner for a vehicle, comprising:
   an air-conditioning unit for controlling the temperature of air at a desired value;
   a duct for guiding the temperature-controlled air toward a passenger compartment of the vehicle; and
   an airflow regulator disposed in the duct for regulating a rate of flow of the temperature-controlled air to be discharged from the duct, the airflow regulator comprising a plurality of hollow frustoconical members placed one over another in a nested condition, each of the frustoconical members being open at a small end and a large end thereof, the small end being disposed near an air outlet of the duct and the large end being disposed relatively remote from the duct air outlet, such that the small end is downstream of the large end in a direction of air flow, and having at least one opening formed in a sidewall thereof, the frustoconical members being rotatable relative to one another about a common central axis thereof, wherein the frustoconical members each have a leg extending from an end wall at the small end toward the large end of the respective frustoconical member and having a connecting portion at a distal end thereof, the respective connecting portions of arms being aligned with the common central axis of the frustoconical members and connected together so that the frustoconical members including the respective connecting portions are rotatable relative to one another about the common central axis of the frustoconical members.

8. The air-conditioner according to claim 7, wherein the legs of the respective frustoconical members are arranged to overlap each other when the respective openings in the sidewalls of the frustoconical members are fully closed.

9. The air-conditioner according to claim 1, further comprising an air deflector provided on the air outlet of the duct, wherein the airflow regulator is disposed behind the air deflector.

10. The air-conditioner according to claim 1, wherein the temperature-controlled air flows through the opening in the small end and the opening in the large end.

* * * * *